US012621815B2

(12) United States Patent
Lai et al.

(10) Patent No.: US 12,621,815 B2
(45) Date of Patent: May 5, 2026

(54) BANDWIDTH PART CONFIGURATION BASED ON USE CASE

(71) Applicant: Telefonaktiebolaget LM Ericsson (publ), Stockholm (SE)

(72) Inventors: Xiaoming Lai, Ottawa (CA); Hatem Abou-Zeid, Calgary (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 402 days.

(21) Appl. No.: 18/040,300

(22) PCT Filed: Aug. 13, 2020

(86) PCT No.: PCT/IB2020/057642
§ 371 (c)(1),
(2) Date: Feb. 2, 2023

(87) PCT Pub. No.: WO2022/034366
PCT Pub. Date: Feb. 17, 2022

(65) Prior Publication Data
US 2023/0276416 A1 Aug. 31, 2023

(51) Int. Cl.
*H04W 72/0453* (2023.01)
*H04W 48/12* (2009.01)
*H04W 72/23* (2023.01)
*H04W 72/044* (2023.01)

(52) U.S. Cl.
CPC ....... *H04W 72/0453* (2013.01); *H04W 48/12* (2013.01); *H04W 72/23* (2023.01); *H04W 72/044* (2013.01)

(58) Field of Classification Search
CPC ............. H04W 72/0453; H04W 72/23; H04W 72/044; H04W 48/12
See application file for complete search history.

(56) References Cited

U.S. PATENT DOCUMENTS

2020/0245304 A1 7/2020 Nam et al.
2022/0338205 A1* 10/2022 Lee ..................... H04W 72/543

OTHER PUBLICATIONS

International Search Report and Written Opinion dated Apr. 14, 2021 issued in PCT Application No. PCT/IB2020/057642 filed Aug. 13, 2020, consisting of 20 pages.
3GPP TSG RAN WG1 #98b; R1-1910974; Source: Apple Inc.; Title: Maximum MIMO Layer Adaptation for UE Power Saving; Agenda Item: 7.2.9.3; Document for: Discussion, Decision, Chongqing, China, Oct. 14-18, 2019, consisting of 4 pages.

(Continued)

*Primary Examiner* — Omar J Ghowrwal
(74) *Attorney, Agent, or Firm* — Weisberg I.P. Law, P.A.

(57) ABSTRACT

A method for a network node to adaptively configure bandwidth parts, BWPs, for a wireless device, WD, is provided. The method includes selecting at least one use case to be assigned to at least one BWP, the selecting being based at least in part on a WD context. The method further includes adaptively configuring at least one BWP for the WD based on the selected at least one use case. In addition, a method for a WD supporting communication with a network node is provided. Further, corresponding apparatuses for the network node and the WD are provided.

28 Claims, 10 Drawing Sheets

(56) References Cited

OTHER PUBLICATIONS

3GPP TSG RAN WG4 Meeting #93; R4-1914616; Source: Ericsson; Title: Regarding MIMO Layer Switching for UE Power Saving Work; Agenda Item: 9.7.2; Document for: Approval; Reno, Nevada, Nov. 18-22, 2019, consisting of 2 pages.
3GPP TSG RAN WG1 Meeting #96; R1-1901804; Source: MediaTek Inc.; Title: NR UE Power Saving Designs; Agenda Item: 7.2.9.2; Document for: Discussion and Decision; Athens, Greece, Feb. 25-Mar. 1, 2019, consisting of 28 pages.
3GPP TSG RAN Meeting #86; RP-193089; Source: MediaTek Inc. (Moderator); Title: Rel-17 UE Power Saving: Summary of Email Discussion; Agenda Item: 9.1.2; Document for: Discussion, Sitges, Spain, Dec. 9-12, 2019, consisting of 28 pages.
Xingqin Lin et al.; A Primer on Bandwidth Parts in 5G New Radio; Cornell University Library; Apr. 2, 2020, consisting of 7 pages.
3GPP TS 38.211 V15.8.0 (Dec. 2019) 3rd Generation Partnership Project; Technical Specification Group Radio Access Network; NR; Physical Channels and Modulation (Release 15), consisting of 97 pages.
3GPP TS 38.331 V15.8.0 (Dec. 2019) 3rd Generation Partnership Project; Technical Specification Group Radio Access Network; NR; Radio Resource Control (RRC) Protocol Specification (Release 15), consisting of 532 pages.

* cited by examiner

Overall carrier

Small part of bandwidth to some WDs

Overall carrier

Overall carrier contains two non-continuous BWPs

Overall carrier

Something completely unknown

Overall carrier

Same bandwidth with different BWP configurations

Overall carrier

1. WD traffic/channel conditions change
2. RRC config-2 is now the better configuration
3. WD configuration is changed to that of RRC config-2 using a DCI. The DCI instructs the WD to switch the active bandwidth part to BWP-2

1

BANDWIDTH PART CONFIGURATION BASED ON USE CASE

CROSS-REFERENCE TO RELATED APPLICATION

This application is a Submission Under 35 U.S.C. § 371 for U.S. National Stage Patent Application of International Application Number: PCT/IB2020/057642, filed Aug. 13, 2020 entitled, "ADAPTIVE ALGORITHMS FOR BAND- WIDTH PART CONFIGURATION TO ENABLE FAST WIRELESS DEVICE RECONFIGURATION," the entirety of which is incorporated herein by reference.

TECHNICAL FIELD

Wireless communication and in particular, apparatuses and methods for adaptively configuring bandwidth part to enable fast wireless device reconfiguration in New Radio.

BACKGROUND

Radio access technologies, such as those provided based on standards promulgated by the 3rd Generation Partnership Project (3GPP), include technologies such as Long Term Evolution (LTE) and New Radio (NR) (also referred to as 5G). With the introduction of NR, a bandwidth parts (BWP) concept is also introduced. The concept of BWP enables flexibility in how resources are assigned in a carrier. As shown in FIGS. 1 and 2, with BWP, multiple, different signal types can be sent in a bandwidth. Some of the benefits of BWPs may include:

1. Supporting a narrowband wireless device (WD) on a large carrier;
2. Operating a carrier with multiple numerologies;
3. Allowing bandwidth (BW) adaptation for WD power saving; and
4. Allowing Radio Resource Control (RRC) reconfigura- tion to become fast through BWP-based Downlink Control Information (DCI) switching.

These benefits may be obtained without a need for band- width change.

Based on the 3GPP standards, a WD can be configured up to four uplink (UL) and four downlink (DL) BWPs, but only one BWP is active at a given time. Each BWP may be configured using RRC reconfiguration message before the BWP can be switched to be active. An example WD setup sequence is shown in FIG. 3. One disadvantage of switching by RRC reconfiguration and timer is that the switching takes longer than other methods.

SUMMARY

The present disclosure describes intelligent apparatuses and methods for determining and coordinating use cases to set up BWPs adaptively and dynamically, so that usage of the BWP may be maximized and RRC overhead minimized, i.e., to maximize the benefits obtained from limited number of BWPs.

Some embodiments advantageously provide apparatuses and methods for adaptively configuring bandwidth part to enable fast WD reconfiguration.

According to one aspect of the present disclosure, a method for a network node to adaptively configure band- width parts, BWPs, for a wireless device, WD, is provided. The method includes selecting at least one use case to be assigned to at least one BWP, the selecting being based at least in part on a WD context, and adaptively configuring at least one BWP for the WD based on the selected at least one use case.

In some embodiments of this aspect, the method further includes configuring the WD to communicate with the network node utilizing at least one preconfigured BWP. In other embodiments of this aspect, the method includes determining the WD context. The WD context is based at least in part on at least one of received signals from the WD and an estimated WD context. The estimated WD context is estimated by the network node based at least on one of a monitoring scheduling behavior to WD (22) and the received signals from the WD. In another embodiment of this aspect, adaptively configuring at least one BWP for the WD further includes assigning the at least one use case to the at least one BWP and transmitting the at least one BWP to the WD. In yet another embodiment of this aspect, the at least one BWP is transmitted to the WD via a predefined message type. The at least one BWP includes a BWP configuration associated with the at least one use case.

In some embodiments of this aspect, an active BWP in current use for communication between the network node and the WD is determined. A next BWP is selected from the at least one adaptively configured BWP based on the WD context. The active BWP switched by making the next BWP the active BWP for communication between the network node and the WD. The method further includes transmitting a signal to the WD based on the active BWP. The transmitted signal identifies at least the next BWP.

In other embodiments of this aspect, switching the active BWP includes switching the active BWP using downlink control information, DCI. In another embodiment of this aspect, selecting a next BWP is further based on at least a trigger threshold predefined in the selected at least one use case. In yet another embodiment of this aspect, selecting at least one use case is further based on a use case priority. The use case priority includes at least one of a predefined importance of the at least one use case and a quality of service, QoS, threshold.

According to another aspect of the present disclosure, a method for a wireless device, WD, supporting communica- tion with a network node, is provided. The method includes receiving a signal having at least one adaptively configured BWP based on at least one use case and a WD context and storing the at least one adaptively configured BWP for communication with the network node.

In some embodiments of this aspect, the method further includes receiving a configuration, the configuration includ- ing at least one preconfigured BWP and configuring the WD based on the configuration to communicate with the network node utilizing the at least one preconfigured BWP. In another embodiment of this aspect, the signal having at least one adaptively configured BWP is received via a predefined message type.

In other embodiments of this aspect, the method further includes receiving a signal by an active BWP identifying at least a next BWP, retrieving an adaptively configured BWP based at least on the next BWP, and switching to the retrieved actively configured BWP for communication between the WD and the network node. In another embodi- ment of this aspect, switching to the retrieved actively configured BWP is based at least on downlink control information, DCI. In some embodiments of this aspect, identifying at least a next BWP is based at least on a trigger threshold predefined in at least one use case associated with the next BWP. In other embodiments of this aspect, the at least one use case is selected based on a use case priority, the use case priority including at least one of a predefined importance of the at least one use case and a quality of service, QoS, threshold.

According to another aspect of the present disclosure, a network node is configured to adaptively configure bandwidth parts, BWPs, for a wireless device, WD. The network node includes processing circuitry. The processing circuitry has a processor and a memory. The processing circuitry is configured to select at least one use case to be assigned to at least one BWP. Selecting at least one use case is based at least in part on a WD context. The processing circuitry is further configured to adaptively configure at least one BWP for the WD based on the selected at least one use case.

In some embodiments of this aspect, the processing circuitry is further configured to configure the WD to communicate with the network node utilizing at least one preconfigured BWP. In other embodiments of this aspect, the processing circuitry is further configured to determine the WD context, where the WD context is based at least in part on at least one of received signals from the WD and an estimated WD context. The estimated WD context is estimated by the network node based at least on one of a monitoring scheduling behavior to WD (22) and the received signals from the WD. In another embodiment of this aspect, adaptively configuring at least one BWP for the WD further includes assigning the at least one use case to the at least one BWP and causing transmission of the at least one BWP to the WD. In yet another embodiment of this aspect, the at least one BWP is caused to be transmitted to the WD via a predefined message type. The at least one BWP includes a BWP configuration associated with the at least one use case In some embodiments of this aspect, the processing circuitry is further configured to determine an active BWP in current use for communication between the network node and the WD and select a next BWP from the at least one adaptively configured BWP based on the WD context. The processing circuitry is further configured to switch the active BWP by making the next BWP the active BWP for communication between the network node and the WD and cause transmission of a signal to the WD based on the active BWP, the transmission of the signal identifying at least the next BWP.

In other embodiments of this aspect, switching the active BWP includes switching the active BWP using downlink control information, DCI. In another embodiment of this aspect, selecting a next BWP is further based on at least a trigger threshold predefined in the selected at least one use case. In yet another embodiment of this aspect, selecting at least one use case is further based on a use case priority. The use case priority includes at least one of a predefined importance of the at least one use case and a quality of service, QoS, threshold.

According to another aspect of the present disclosure, a wireless device, WD, is configured to communicate with a network node. The WD includes a radio interface configured to receive a signal having at least one adaptively configured BWP based on at least one use case and a WD context. The WD further includes processing circuitry in communication with the radio interface. The processing circuitry has a processor and a memory. The processing circuitry is configured to store the at least one adaptively configured BWP for communication with the network node.

In some embodiments of this aspect, the radio interface is further configured to receive a configuration. The configuration includes at least one preconfigured BWP. The processing circuitry is further configured to configure the WD based on the configuration to communicate with the network node utilizing the at least one preconfigured BWP. In another embodiment of this aspect, the signal having at least one adaptively configured BWP is received via a predefined message type.

In other embodiments of this aspect, the radio interface is further configured to receive a signal by an active BWP identifying at least a next BWP. The processing circuitry is further configured to retrieve an adaptively configured BWP based at least on the next BWP and switch to the retrieved actively configured BWP for communication between the WD and the network node. In another embodiment of this aspect, switching to the retrieved actively configured BWP is based at least on downlink control information, DCI. In some embodiments of this aspect, identifying at least a next BWP is based at least on a trigger threshold predefined in at least one use case associated with the next BWP. In other embodiments of this aspect, the at least one use case is selected based on a use case priority. The use case priority includes at least one of a predefined importance of the at least one use case and a quality of service, QoS, threshold.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
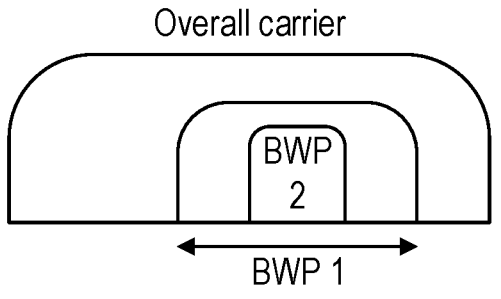
FIG. 1 illustrates an example of New Radio bandwidth parts, BWP, of different services on a given carrier.
Figure 1:
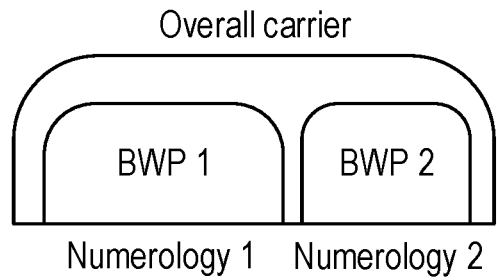
Figure 1:
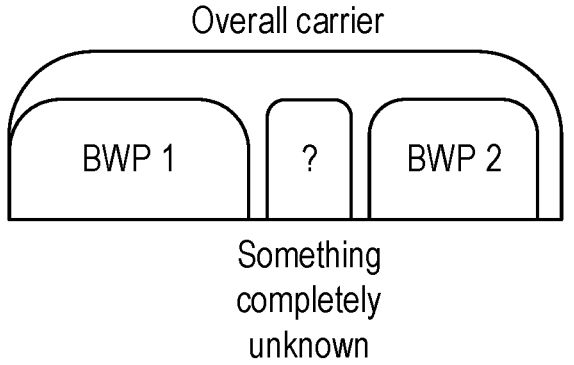
Figure 1:
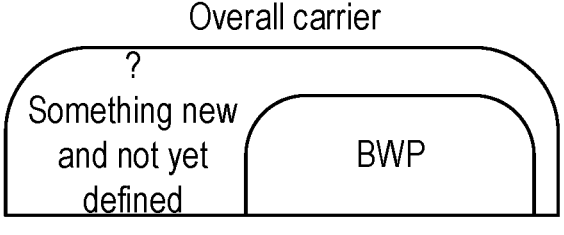
Figure 2:
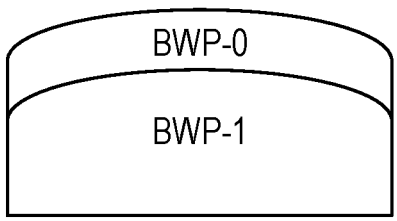
FIG. 2 illustrates an example of BWP configurations with the same bandwidth.
Figure 3:
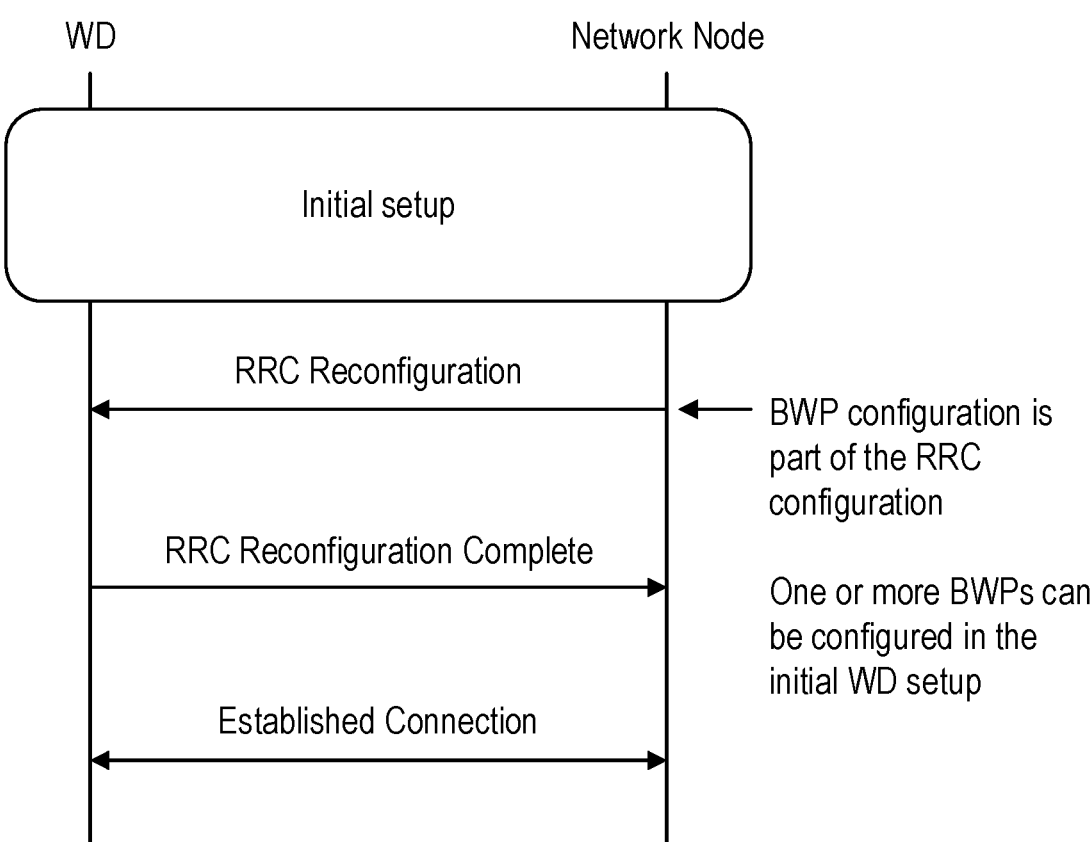
FIG. 3 is a flow chart of an example method for initial WD setup.

Some embodiments of the present disclosure provide methods and arrangements that provide for dynamic reconfiguration in use cases and for RRC parameters in a BWP. In some embodiments, use cases are provided based at least on changing conditions. Reconfiguration/configurations may be determined in advance for different WDs separately. In addition, a use case may be provided for a WD by monitoring the WD context, e.g., situation/condition, based at least on parameters such as buffer size status, traffic type, e.g., voice or data, WD speed, signal quality, SINR, and based on monitoring scheduling behavior to the WD, etc. A network node may monitor an RRC session length and traffic characteristics and determine when and which adaptive configuration use cases are to be selected based on WD context and/or parameters. The network node may also determine how BWPs should be configured for each WD An example method performed at a network node according to some embodiments of the present disclosure is as follows. Upon initial access, the example method includes monitoring WD context, including traffic requirements and other context, such as location and speed. The WD may be obtained from received signals from the WD and/or estimated by the network node from the received signals from the WD. BWP configurations, including content and number of configurations, for the WD are determined based on the monitored WD context, e.g., in order to maximize usage of configured BWPs, such as during an RRC session. During communication with the WD, such as an RRC session, the method monitors WD context to determine when to switch the active BWP, currently used by the WD, to another BWP. A DCI may be transmitted to the WD. The DCI may include a target BWP identification, BWP-ID.

Other embodiments of the present disclosure provide methods and arrangements to perform BWP-based DCI switching that is fast and provides less switch delay than traditional RRC reconfiguration switching. Some cases where a WD may benefit from BWP-based DCI switching includes when a WD encounters changes in channel condition and when a WD is in/near a cell edge. In addition, BWPs may be defined for a use case based on pre-defined priorities, measurements, QOS, to target a performance requirement of BWPs and expand the number of use cases.

Before describing in detail example embodiments, it is noted that the embodiments reside primarily in combinations of apparatus components and processing steps related to adaptive methods for bandwidth part configuration to enable fast wireless device reconfiguration. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein.

As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU), Remote Radio Head (RRH), baseband unit (BBU), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, the term "radio resource" is intended to indicate a frequency resource and/or a time resource. The time resource may correspond to any type of physical resource or radio resource expressed in terms of length of time. Examples of time resources are: symbol, time slot, subframe, radio frame, transmission time interval (TTI), interleaving time, etc. The frequency resource may correspond to one or more resource elements, subcarriers, resource blocks, bandwidth part and/or any other resources in the frequency domain. The radio resource may also indicate a combination of subcarriers, time slots, codes and/or spatial dimensions.

Even though the descriptions herein may be explained in the context of one of a Downlink (DL) and an Uplink (UL) communication, it should be understood that the basic principles disclosed may also be applicable to the other of the one of the DL and the UL communication. For DL communication, the network node is the transmitter and the receiver is the WD. For the UL communication, the transmitter is the WD and the receiver is the network node.

Although some the examples herein may be explained in the context of a WD being allocated radio resources on a physical channel for a periodic reference signal (e.g., SRS), it should be understood that the principles may also be applicable to other signals and other types of resources or other channels.

In some embodiments, the allocated radio resource may be allocated for a particular signal and on a particular channel. Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have at least two component channels, one for each direction. Examples of channels comprise a channel for low latency and/or high reliability transmission, in particular a channel for Ultra-Reliable Low Latency Communication (URLLC), which may be for control and/or data. In some embodiments, the channel described herein may be an uplink channel and in further embodiments may be a physical uplink shared channel (PUSCH) or a physical uplink control channel (PUCCH). In some embodiments, the channel may be a downlink channel, such as, a physical downlink control channel (PDCCH) or a physical downlink shared channel (PDSCH).

Transmitting in downlink may pertain to transmission from the network or network node to the terminal. The terminal may be considered the WD or UE. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide arrangements for adaptive algorithms for bandwidth part configuration to enable fast wireless device reconfiguration.

Figure 4:
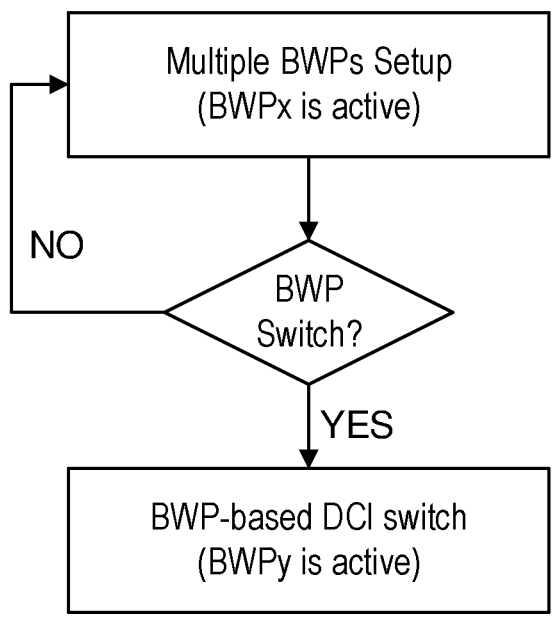
FIG. 4 is a flow chart of an example method for BWP switching according to some embodiments of the present disclosure.

Referring again to the drawing figures, in which like elements are referred to by like reference numerals, there is shown in FIG. 4 a flow chart of an example method for BWP switching according to some embodiments of the present disclosure. A configured BWP can be dynamically switched to become active by selecting from various BWPs. In the example method, one BWP is active at a time, e.g., BWPx. In addition, a configured BWP may be triggered to become active dynamically. A trigger condition may be predefined such that when the trigger condition is met, a BWP switch occurs, e.g., BWPy becomes active. The BWP switch is provided to a WD by using DCI. Details relating to BWP setup and BWP switching are discussed below.

Switching among BWPs may be triggered by RRC reconfiguration, timer and DCI. More specifically, switching by RRC reconfiguration includes an indication in the new RRC message of the BWP to be selected to become active. Switching by timer involves the new RRC message indicating an amount of time that must elapse before the WD falls back to a default BWP. For example, BWP switching by DCI includes indicating a BWP in a physical downlink control where additional DMRS symbols are updated. Additional examples may be found in Table 1.

There are cases in which BWP switching is utilized to achieve fast WD reconfiguration without changing bandwidth. BWP-based DCI switching may include configuring different use cases (e.g., physical parameters) in different BWPs in advance by RRC reconfiguration message. When a condition is changed and met, e.g., a pre-defined trigger condition, the BWP is switched by means of DCI.

TABLE 1

List of part of use cases that benefit from BWP-based DCI switching.

| | The Benefits | Configured parameters | DL/UL |
|---|---|---|---|
| High Speed WD | Improve WD performance in high speed vehicle by using longer DMRS symbols. | DMRS-DownlinkConfig->dmrs-AdditionalPosition; DMRS-UplinkConfig->dmrs-AdditionalPosition; | DL and UL |
| WD Tx ports | Improve coverage/performance in cell edge with one port to two ports switch | SRS-config->nrofSRS-Ports; PUSCH-config->maxRank; PUSCH-config->codebookSubset; | UL |
| Quadrature Amplitude Modulation (QAM) switch | Improve overall WD performance. QAM256 table is good in higher signal-to-noise ratio (SINR) and QAM64 table is better in a lower SINR. | PUSCH-Config->mcs-table; PDSCH->mcs-table | DL and UL |
| Uplink waveform | Improve coverage/performance in cell edge, cyclic prefix orthogonal frequency division multiplexing (CP-OFDM) Better link performance at high SINR Discrete Fourier transform spread orthogonal frequency-division multiplexing (DFT-S-OFDM) Lower peak to average power ratio Better Coverage | PUSCH-Config->transformPrecoder: Enabled DFT-S-OFDM; Disabled CP-OFDM | UL |
| Slot-aggregation | Improve the performance in the cell edge and voice over internet protocol (VOIP) WDs. | PDSCH-Config->pdsch-AggregationFactor; PUSCH-Config->pusch-AggregationFactor; | DL and UL | channel (PDCCH) to be selected as active. BWP switching using DCI is fast, and may be a useful switching method, especially in delay-sensitive use cases.

In order to update RRC parameters, an RRC reconfiguration may be transmitted to a WD. The typical time delay between the start of an RRC reconfiguration and the completion of the RRC reconfiguration for a reasonable size RRC reconfiguration message is around 80 ms. However, the typical time delay may be too long in many cases, such as cases that include WDs with high speed and the WDs are in/near a cell edge.

Some nonlimiting examples that may benefit from BWP-based DCI switching are listed below in Table 1. More specifically, Table 1 includes examples of use cases, benefits, and RRC configuration parameters.

Some physical parameters require to be updated dynamically based on radio channel condition, speed, etc. For example, better performance may be obtained by using more demodulation reference signal (DMRS) symbols when a WD is in high speed. However, an RRC reconfiguration message is required to update the configuration of the additional DMRS symbols, which introduces undesired time delays as described above. BWP-based DCI switch may advantageously reduce undesired time delay in situations As shown in Table 1, many use cases may benefit from BWP-based DCI switching. However, there is a limitation of the number of available BWPs. Currently, there are four uplinks and downlinks respectively per WD. At least two BWPs are utilized for each use case, which limits the practical application of the use cases. In addition, there is a need to predict what configuration a WD will need as the WD can only be configured with four BWPs, which at most results in four different configurations. In other words, making a desired BWP configuration available to WD in advance allows BWP-based DCI switching to occur. Another disadvantage of current systems is that even when time delay may not be a concern, RRC reconfiguration of multiple BPWs produces a considerable overhead. Therefore, it may be beneficial to determine and configure each WD with the correct BWP-based RRC configuration depending on each WD context (e.g., location, speed, traffic type) to avoid having to reconfigure each WD repeatedly.

Figure 5:
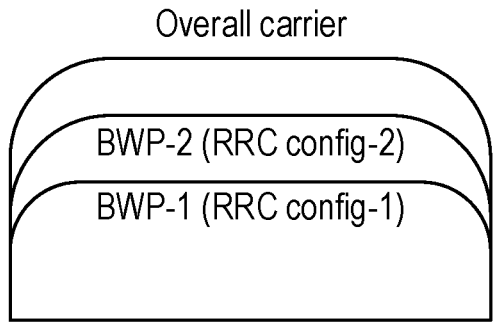
FIG. 5 illustrates an example fast WD configuration switching using BWP.
Figure 5:
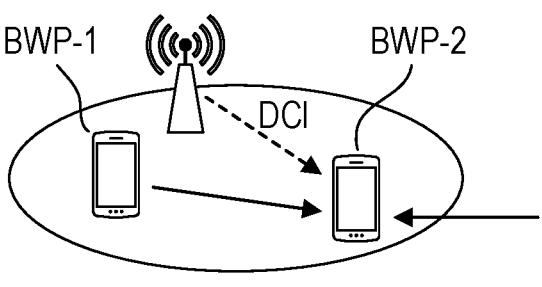

As illustrated in FIG. 5, BWP may be utilized for fast WD configuration switching. A WD supporting communication with at least a network node may have more than one configuration previously received, e.g., from the network node, via a predefined message type, e.g., RRC reconfiguration message. For example, the WD may at least have configurations BWP-1 (RRC config-1) and BWP-2 (RRC config-2). Based in part on a current WD context, e.g., conditions of the WD traffic/channel, the active configuration is BWP-1. When the current WD context changes, such as a change in WD traffic/channel conditions, BWP-2 (RRC config-2) becomes a better or more desirable configuration. Thus, the WD configuration is changed to that of BWP-2 (RRC config-2) by receiving at the WD a switch signal, such as a signal based on DCI transmitted from the network node, instructing the WD to switch the active configuration/BWP to BWP-2 (RRC config-2).

Figure 6:
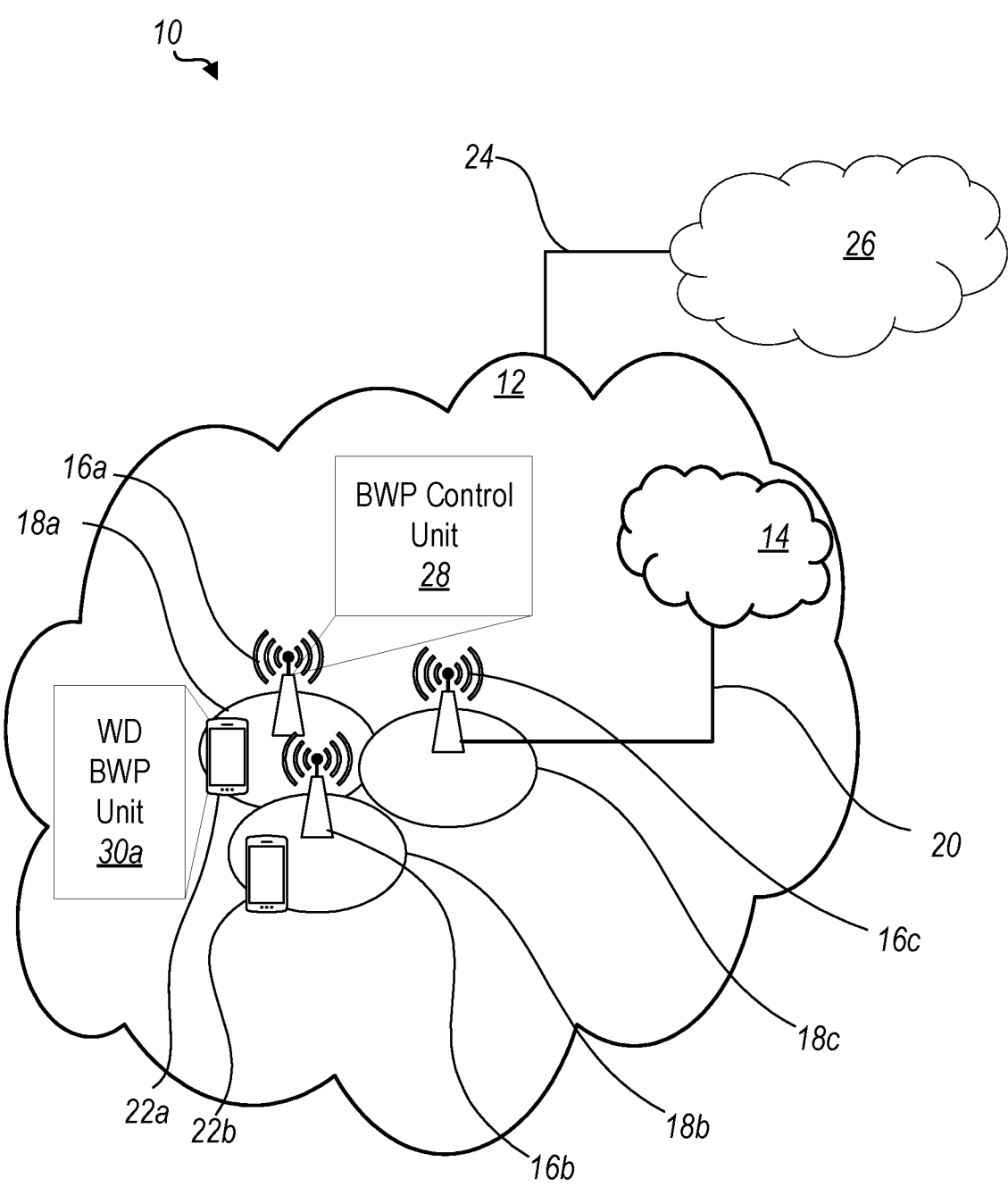
FIG. 6 is a schematic diagram of an example network architecture illustrating a communication system according to the principles in the present disclosure.

FIG. 6 is a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 is configured to include a BWP control unit 28 which is configured at least to cause the network node to adaptively configure BWP for the WD 22 to enable fast WD reconfiguration. A WD 22 is configured to include a WD BWP unit 30 which is configured at least to receive and store at least one adaptively configured BWP and to switch to an actively configured BWP for communication between the WD 22 and the network node 16.

Example implementations, in accordance with an embodiment, of the WD 22 and network node 16 discussed in the preceding paragraphs will now be described with reference to FIG. 7.

The communication system 10 further includes a network node 16 provided in a communication system 10 and including hardware 32 enabling it to communicate with the WD 22. The hardware 32 may include a communication interface 34 for setting up and maintaining a wired or wireless connection with an interface of a different communication device of the communication system 10, as well as a radio interface 36 for setting up and maintaining at least a wireless connection 38 with a WD 22 located in a coverage area 18 served by the network node 16. The radio interface 36 may be formed as or may include, for example, one or more RF transmitters, one or more RF receivers, and/or one or more RF transceivers.

In the embodiment shown, the hardware 32 of the network node 16 further includes processing circuitry 42. The processing circuitry 42 may include a processor 44 and a memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) the memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 48 stored internally in, for example, memory 46, or stored in external memory (e.g., database, storage array, network storage device, etc.) accessible by the network node 16 via an external connection. The software 48 may be executable by the processing circuitry 42. The processing circuitry 42 may be configured to control any of the methods and/or processes described herein and/or to cause such methods, and/or processes to be performed, e.g., by network node 16. Processor 44 corresponds to one or more processors 44 for performing network node 16 functions described herein. The memory 46 is configured to store data, programmatic software code and/or other information described herein. In some embodiments, the software 48 may include instructions that, when executed by the processor 44 and/or processing circuitry 42, causes the processor 44 and/or processing circuitry 42 to perform the processes described herein with respect to network node 16. For example, processing circuitry 42 of the network node 16 may include BWP control unit 28 configured to perform network node methods discussed herein, such as the methods discussed with reference to FIG. 8 as well as other figures.

The communication system 10 further includes the WD 22 already referred to. The WD 22 may have hardware 50 that may include a radio interface 52 configured to set up and maintain a wireless connection 38 with a network node 16 serving a coverage area 18 in which the WD 22 is currently located. The radio interface 52 may be formed as or may include, for example, one or more RF transmitters, one or more RF receivers, and/or one or more RF transceivers.

The hardware 50 of the WD 22 further includes processing circuitry 58. The processing circuitry 58 may include a processor 60 and memory 62. In particular, in addition to or instead of a processor, such as a central processing unit, and memory, the processing circuitry 58 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 60 may be configured to access (e.g., write to and/or read from) memory 62, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 64, which is stored in, for example, memory 62 at the WD 22, or stored in external memory (e.g., database, storage array, network storage device, etc.) accessible by the WD 22. The software 64 may be executable by the processing circuitry 58. The software 64 may include a client application 66. The client application 66 may be operable to provide a service to a human or non-human user via the WD 22. The client application 66 may interact with the user to generate the user data that it provides.

The processing circuitry 58 may be configured to control any of the methods and/or processes described herein and/or to cause such methods, and/or processes to be performed, e.g., by WD 22. The processor 60 corresponds to one or more processors 60 for performing WD 22 functions described herein. The WD 22 includes memory 62 that is configured to store data, programmatic software code and/or other information described herein. In some embodiments, the software 64 and/or the client application 66 may include instructions that, when executed by the processor 60 and/or processing circuitry 58, causes the processor 60 and/or processing circuitry 58 to perform the processes described herein with respect to WD 22. For example, processing circuitry 58 of the WD 22 may include WD BWP unit 30 configured to perform wireless device methods discussed herein, such as the methods discussed with reference to FIG. 9 as well as other figures.

In some embodiments, the processing circuitry 58 of the wireless device 22 may be configured to use resources and/or receive and/or transmit on radio resources (e.g., physical layer resources, such as, physical downlink control channel, physical downlink shared channel, physical uplink control channel and/or physical uplink shared channel, etc.) that are allocated to the WD 22.

Figure 7:
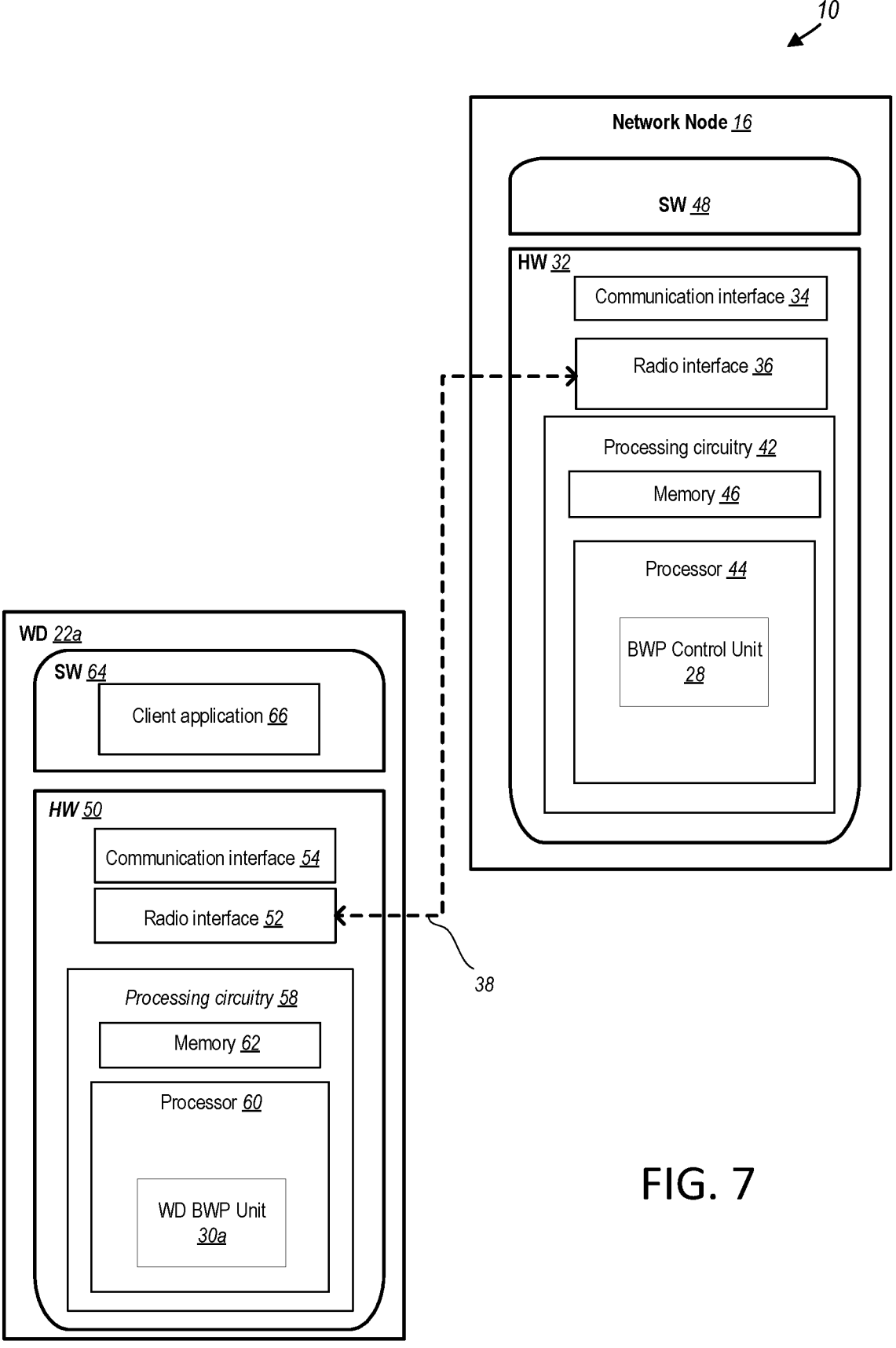
FIG. 7 is a block diagram of a network node in communication with a wireless device over an at least partially wireless connection according to some embodiments of the present disclosure.

In some embodiments, the inner workings of the network node 16 and WD 22, may be as shown in FIG. 7 and independently, the surrounding network topology may be that of FIG. 6.

Although FIGS. 6 and 7 show various "units" such as each of BWP control unit 28 and WD BWP unit 30_a_ as being within a processor, it is contemplated that these units may be implemented such that a portion of the unit is stored in a corresponding memory within the processing circuitry. In other words, the units may be implemented in hardware or in a combination of hardware and software within the processing circuitry.

Figure 8:
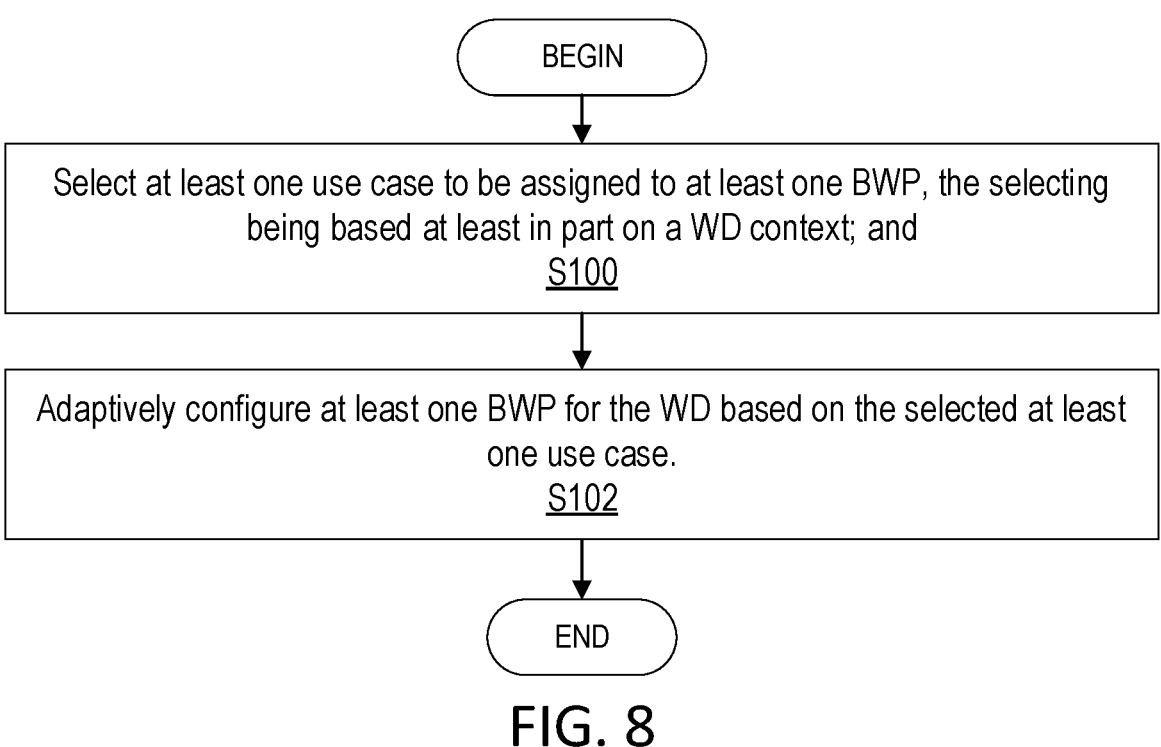
FIG. 8 is a flowchart of an example method for a network node to adaptively configure bandwidth parts, BWPs, for a wireless device, WD, according to one embodiment of the present disclosure.

FIG. 8 is a flowchart of an example method for a network node 16 to adaptively configure BWPs for a WD 22 according to some embodiments of the present disclosure. One or more Blocks and/or functions and/or methods performed by the network node 16 may be performed by one or more elements of network node 16, such as by BWP control unit 28 in processing circuitry 42, processor 44, communication interface 34, radio interface 36, according to the example method. The example method includes selecting (Block S100), such as by BWP control unit 28 in processing circuitry 42, processor 44, communication interface 34, radio interface 36, at least one use case to be assigned to at least one BWP, the selecting being based at least in part on a WD context, and adaptively configuring (Block S102), such as by BWP control unit 28 in processing circuitry 42, processor 44, communication interface 34, radio interface 36, at least one BWP for the WD based on the selected at least one use case.

In some embodiments of this aspect, the method further includes configuring, such as by BWP control unit 28 in processing circuitry 42, processor 44, communication interface 34, radio interface 36, the WD to communicate with the network node utilizing at least one preconfigured BWP. In other embodiments of this aspect, the method includes determining, such as by BWP control unit 28 in processing circuitry 42, processor 44, communication interface 34, radio interface 36, the WD context. The WD context is based at least in part on at least one of received signals from the WD and an estimated WD context. The estimated WD context is estimated, such as by BWP control unit 28 in processing circuitry 42, processor 44, communication interface 34, radio interface 36, by the network node based at least on one of a monitoring scheduling behavior to WD (22) and the received signals from the WD. In another embodiment of this aspect, adaptively configuring at least one BWP for the WD further includes assigning, such as by BWP control unit 28 in processing circuitry 42, processor 44, communication interface 34, radio interface 36, the at least one use case to the at least one BWP and transmitting, such as by BWP control unit 28 in processing circuitry 42, processor 44, communication interface 34, radio interface 36, the at least one BWP to the WD. In yet another embodiment of this aspect, the at least one BWP configuration is transmitted, such as by BWP control unit 28 in processing circuitry 42, processor 44, communication interface 34, radio interface 36, to the WD via a predefined message type.

In some embodiments of this aspect, an active BWP in current use for communication between the network node and the WD is determined, such as by BWP control unit 28 in processing circuitry 42, processor 44, communication interface 34, radio interface 36. A next BWP is selected, such as by BWP control unit 28 in processing circuitry 42, processor 44, communication interface 34, radio interface 36, from the at least one adaptively configured BWP based on the WD context. The active BWP switched, such as by BWP control unit 28 in processing circuitry 42, processor 44, communication interface 34, radio interface 36, by making the next BWP the active BWP for communication between the network node and the WD. The method further includes transmitting, such as by BWP control unit 28 in processing circuitry 42, processor 44, communication interface 34, radio interface 36, a signal to the WD based on the active BWP. The transmitted signal identifies at least the next BWP.

In other embodiments of this aspect, switching the active BWP includes switching, such as by BWP control unit 28 in processing circuitry 42, processor 44, communication interface 34, radio interface 36, the active BWP using downlink control information, DCI. In another embodiment of this aspect, selecting a next BWP is further based on at least a trigger threshold predefined, such as by BWP control unit 28 in processing circuitry 42, processor 44, communication interface 34, radio interface 36, in the selected at least one use case. In yet another embodiment of this aspect, selecting at least one use case is further based on a use case priority. The use case priority includes at least one of a predefined importance of the at least one use case and a quality of service, QoS, threshold.

Figure 9:
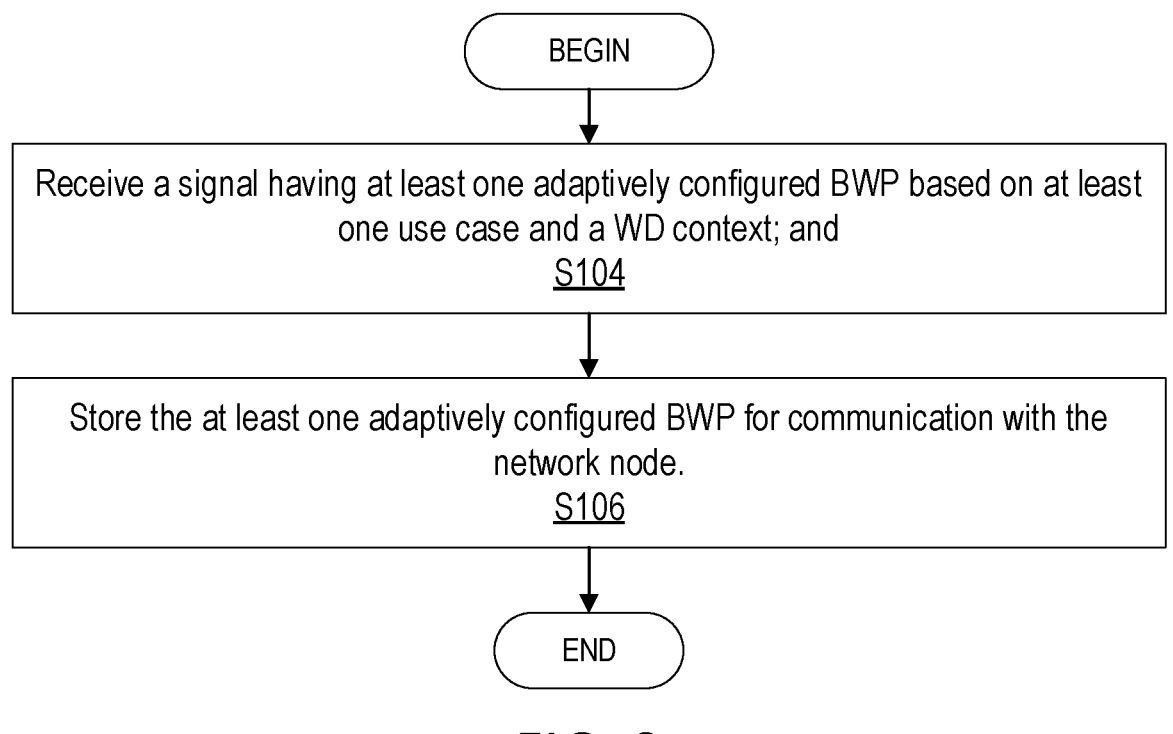
FIG. 9 is a flowchart of an example method for a wireless device, WD, supporting communication with a network node according to one embodiment of the present disclosure.

FIG. 9 is a flowchart of an example method for a WD 22, supporting communication with a network node 16 according to some embodiments of the present disclosure. One or more Blocks and/or functions and/or methods performed by WD 22 may be performed by one or more elements of WD 22, such as by WD BWP unit 30 in processing circuitry 58, processor 60, communication interface 54, radio interface 52, etc. The example method includes receiving (Block S104), such as by WD BWP unit 30 in processing circuitry 58, processor 60, communication interface 54, radio interface 52, a signal having at least one adaptively configured BWP based on at least one use case and a WD context and storing (Block S106), such as by WD BWP unit 30 in processing circuitry 58, processor 60, communication interface 54, radio interface 52, the at least one adaptively configured BWP for communication with the network node.

In some embodiments of this aspect, the method further includes receiving, such as by WD BWP unit 30 in processing circuitry 58, processor 60, communication interface 54, radio interface 52, a configuration, the configuration including at least one preconfigured BWP and configuring, such as by WD BWP unit 30 in processing circuitry 58, processor 60, communication interface 54, radio interface 52, the WD based on the configuration to communicate with the network node utilizing the at least one preconfigured BWP. In another embodiment of this aspect, the signal having at least one adaptively configured BWP is received, such as by WD BWP unit 30 in processing circuitry 58, processor 60, communication interface 54, radio interface 52, via a predefined message type.

In other embodiments of this aspect, the method further includes receiving, such as by WD BWP unit 30 in processing circuitry 58, processor 60, communication interface 54, radio interface 52, an active BWP signal (i.e., receiving a signal by an active BWP) identifying at least a next BWP, retrieving, such as by WD BWP unit 30 in processing circuitry 58, processor 60, communication interface 54, radio interface 52, an adaptively configured BWP based at least on the next BWP, and switching, such as by WD BWP unit 30 in processing circuitry 58, processor 60, communication interface 54, radio interface 52, to the retrieved actively configured BWP for communication between the WD and the network node. In another embodiment of this aspect, switching, such as by WD BWP unit 30 in processing circuitry 58, processor 60, communication interface 54, radio interface 52, to the retrieved actively configured BWP is based at least on downlink control information, DCI. In some embodiments of this aspect, identifying, such as by WD BWP unit 30 in processing circuitry 58, processor 60, communication interface 54, radio interface 52, at least a next BWP is based at least on a trigger threshold predefined in at least one use case associated with the next BWP. In other embodiments of this aspect, the at least one use case is selected, such as by WD BWP unit 30 in processing circuitry 58, processor 60, communication interface 54, radio interface 52, based on a use case priority, the use case priority including at least one of a predefined importance of the at least one use case and a quality of service, QoS, threshold.

Having described the general process flow of arrangements of the disclosure and having provided examples of hardware and software arrangements for implementing the processes and functions of the disclosure, the sections below provide details and examples of arrangements for adaptively configuring bandwidth part to enable fast wireless device reconfiguration which may be implemented by the network node 16 and/or wireless device 22.

Some embodiments provide one or more techniques for adaptively configuring BWP to enable fast wireless device reconfiguration (as compared with known solutions) of one or more WDs 22. In particular, some embodiments may perform BWP switching without bandwidth changing. Each BWP may be configured with parameters which are suitable for different situations and channel conditions. When a condition changes, a BWP may be switched to fit the condition change, e.g., a new condition. As illustrated in FIG. 4, the BWP switch may include two parts: (1) BWP configuration/set up; and (2) BWP switch based on monitored conditions. For example, a network node may configure a 256QAM table in BWP0 and a 64QAM table in BWP1 in advance. BWP0 in the WD may be active first. When SINR in WD is degraded and/or lower than a predefined threshold, then a BWP switch takes place and BWP1 in the WD becomes active.

In some embodiments, each use case utilizes at least two BWPs to perform a BWP switch. To utilize the available number BWPs and to apply BWP switch for many use cases, a BWP switching may include adaptive BWP switching based on use-cases. In other words, adaptive BWP switching may control the timing and content of the use cases configured in the BWPs.

Figure 10:
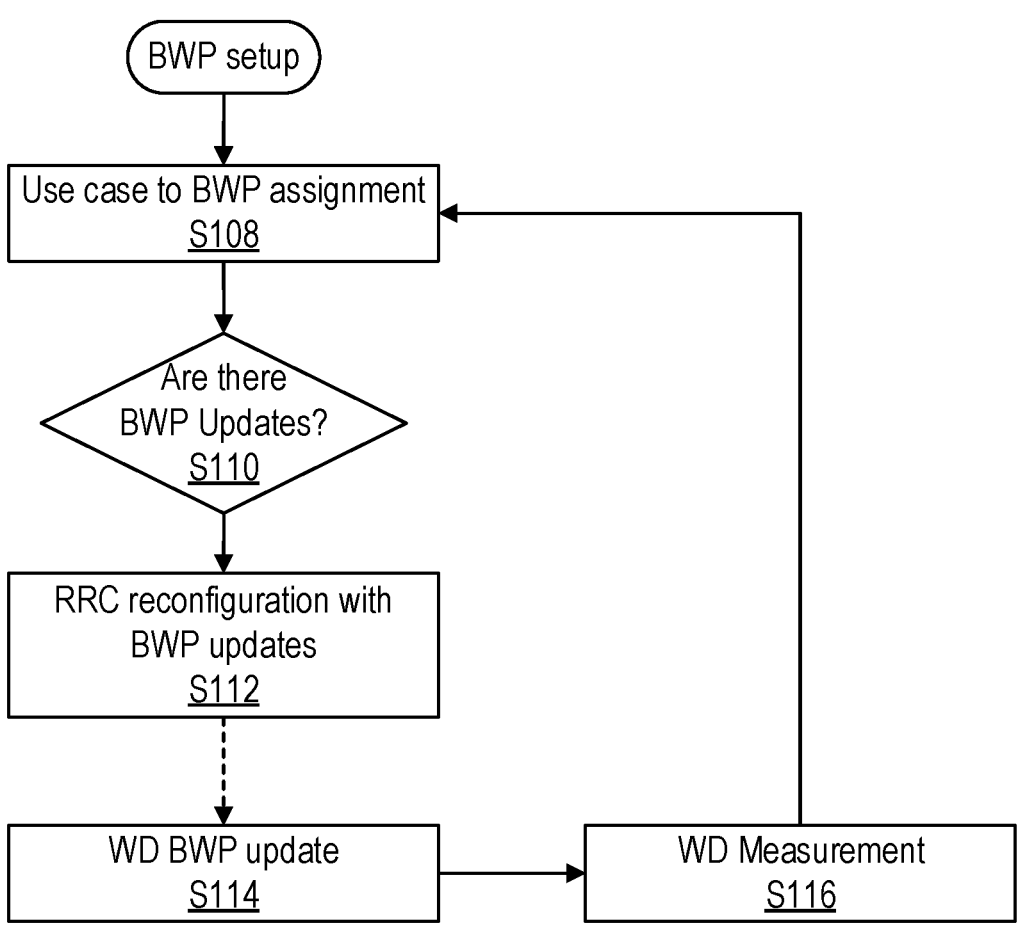
FIG. 10 is a flow chart of an example method for setting up multiple BWP according to some embodiments of the present disclosure.

FIG. 10 illustrates a flow chart of an example method for setting up multiple BWP. The BWP setup includes selecting (Block S108), e.g., via processing circuitry 42 and/or processor 44 and/or BWP control unit 28, use cases to be assigned to BWPs. If there are BWP updates (Block S110), the selected use case(s) may be configured (Block S112), e.g., via processing circuitry 42 and/or processor 44 and/or BWP control unit 28 and/or radio interface 36, in the BWPs by a predefined message type, such as RRC reconfiguration message for the WD 22 to perform a BWP update (Block S114), e.g., via processing circuitry 58 and/or processor 60 and/or WD BWP unit 30 and/or radio interface 52. WD measurements may be reported (Block S116) by the WD 22, e.g., via radio interface 52 and/or processing circuitry 58 and/or processor 60, or estimated by the network node 16, e.g., by processing circuitry 42 and/or processor 44 and/or radio interface 36, from the received signals. Additional details relating to BWP setup are shown in FIGS. 11-14.

Figure 11:
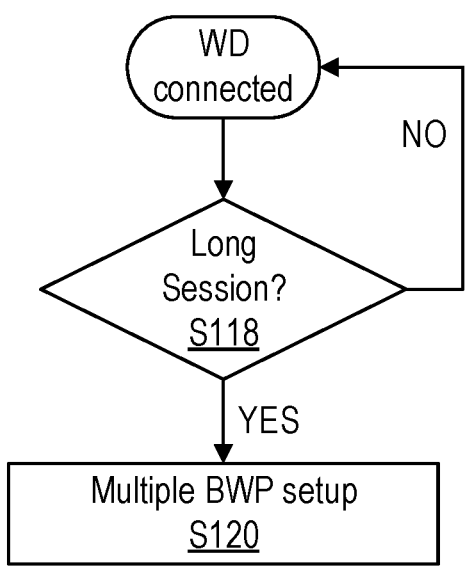
FIG. 11 is a flow chart of an example method for multiple BWP setup applied to a long session WD to reduce overhead according to some embodiments of the present disclosure.

As illustrated in FIG. 11, a WD communication session may be taken into account to avoid BWP setup overhead. For example, if the WD communication session is determined to be a short session, i.e., not a long session, (Block S118), e.g., via processing circuitry 42 and/or processor 44 and/or BWP control unit 28 and/or radio interface 36, the network node 16 may hold setting up multiple BWPs, e.g., to reduce overhead. The determination of length of the communication session, such as whether a WD communication session is a short session or long session, may be based on a predefined time threshold or predicted based on buffer status report (BSR) status. If the WD session is determined to be a long session (Block S118), the network node 16 may set up (Block S120), e.g., via processing circuitry 42 and/or processor 44 and/or BWP control unit 28 and/or radio interface 36, multiple BWPs.

In some other embodiments, a use case priority may be defined, e.g., dynamically, or predefined with default values, and assigned, e.g., via processing circuitry 42 and/or processor 44 and/or BWP control unit 28, at least to some use cases. Defining a use case dynamically may be based on QoS. Predefined use case priority may be based on a defined status. In cases where conflicts between two use cases arise, the network node 16 may select, e.g., via processing circuitry 42 and/or processor 44 and/or BWP control unit 28, among use cases based on each use case priority. For the time sensitive use cases, higher priority merit may be assigned to a use case to avoid/reduce time delay. For example, some cases that may utilize use case priorities may include WDs 22 with high speed, ultra-reliable low-latency communication (URLLC), voice over internet protocol (VOIP), etc.

In another embodiment, the network node 16 may group/bundle, e.g., via processing circuitry 42 and/or processor 44 and/or BWP control unit 28, two or more use cases, e.g., if the use cases share a common trigger condition. By grouping use cases, BWP usage may be reduced as compared to not grouping use cases. For example, the network node may group/bundle a transmit (Tx) port and a waveform in uplink to use the same BWPs. Each time there is a BWP switch associated with the Tx port and/or the waveform, the Tx port and waveform use cases would be switched.

Figure 12:
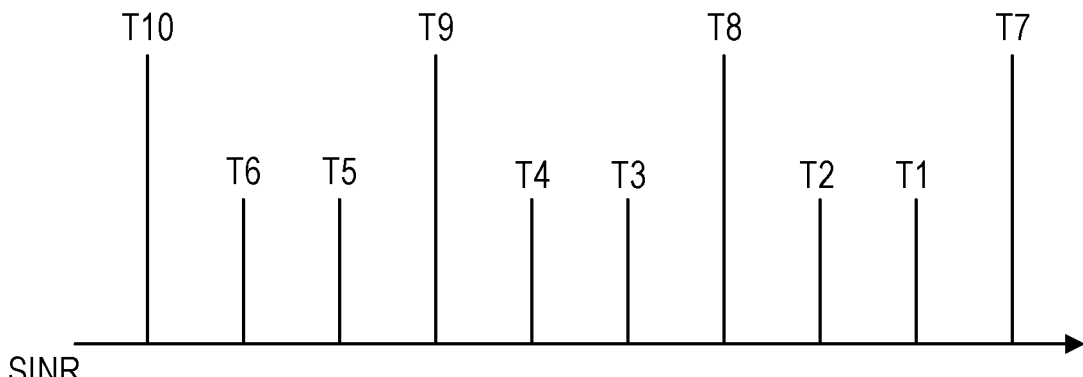
FIG. 12 illustrates an example of SINR conditions for different use cases according to some embodiments of the present disclosure.

As illustrated in the non-limiting example of FIG. 12, there may be different trigger thresholds for different use cases, even when the use cases may be associated with a common parameter such SINR. For example, when utilizing SINR to trigger, e.g., via processing circuitry 42 and/or processor 44 and/or BWP control unit 28, BWP setup or BWP switch, a higher SINR may be associated to work on QAM switch, while a lower SINR for slot aggregation. In other words, use case associated with QAM and use cases associated with slot-aggregation may be triggered by different conditions. Therefore, the same BWPs may be shared for different use cases.

More specifically, each of T1, T2, T3, T4, T5 and T6 represents a trigger threshold of a BWP switch for a use case. For example, T1 may represent a trigger threshold of a BWP switch from 64QAM to 256QAM; T2 may represent a trigger threshold of a BWP switch from 256QAM to 64QAM; T3 may represent a trigger threshold of a BWP switch from 1Tx/DTF-S-OFDM to 2Tx/CP-OFDM; T4 may represent a trigger threshold of a BWP switch from 2Tx/CP-OFDM to 1Tx/DTF-S-OFDM; T5 may represent a trigger threshold of a BWP switch from high factor slot aggregation to low factor slow aggregation; and T6 may represent from low factor slow aggregation to high factor slot aggregation.

Each of T7, T8, T9 and T10 represents a trigger threshold of a BWP setup for a use case. For example, a SINR range of T8-T7 may represent a range for which a 64/256QAM use case may be set up; a SINR range of T9-T8 may represent a range for which a ports/waveform use case may be set up in BWP; and a SINR range of T10-T9 may represent a range for which a slot aggregation use case may be set up in BWP.

Figure 13:
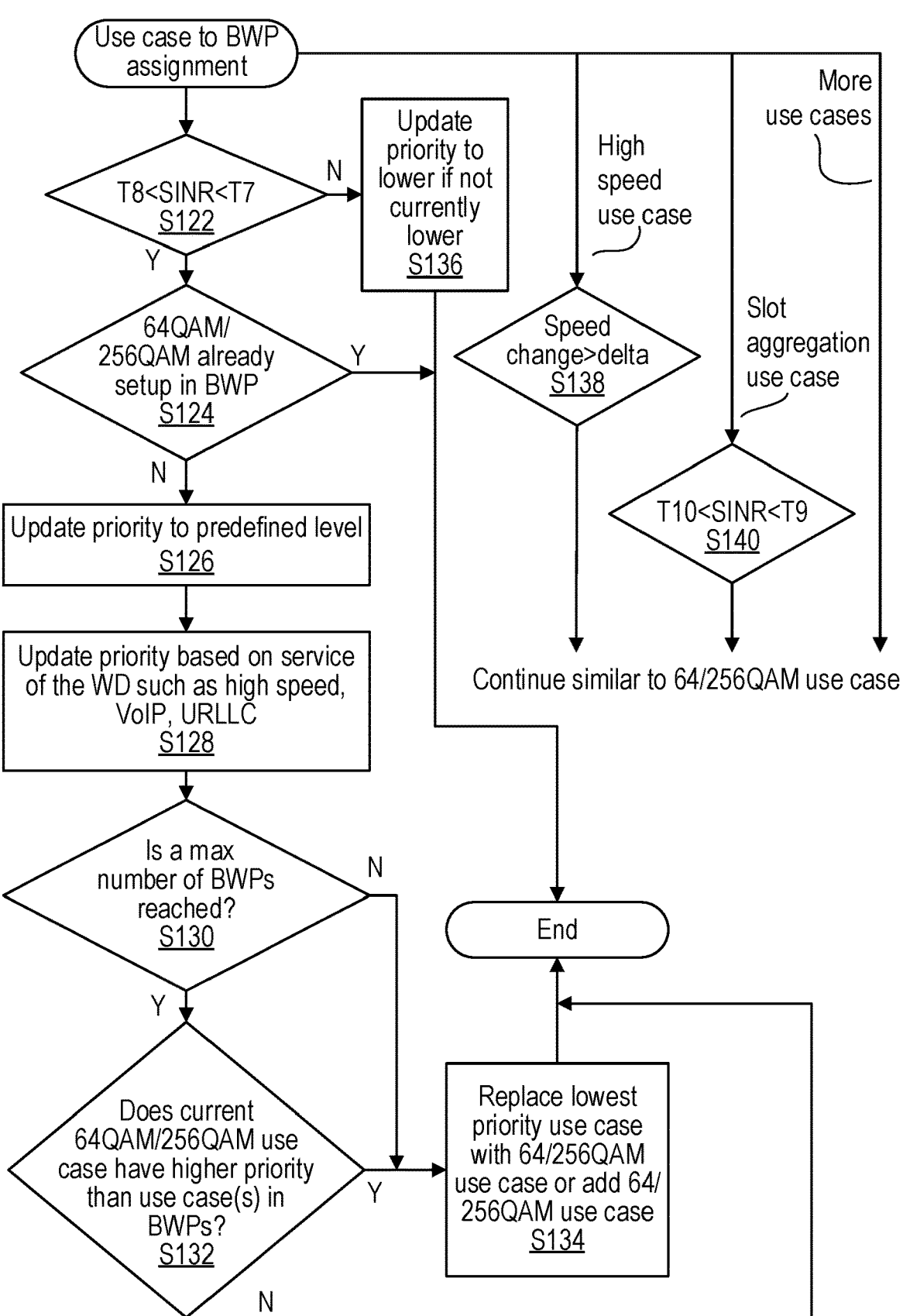
FIG. 13 is a flowchart of an example method for assigning use cases to BWP according to some embodiments of the present disclosure.

FIG. 13 is a flowchart of an example method for assigning use cases to BWP, e.g., via processing circuitry 42 and/or processor 44 and/or BWP control unit 28, including additional detail about BWP setup. The example method includes selecting, e.g., via processing circuitry 42 and/or processor 44 and/or BWP control unit 28, at least a use case to be used in a BWP. In addition, WD context, such as WD context based on measurements that are pre-defined, is monitored. For example, in a 64/256QAM use case, a measurement condition is monitored, i.e., SINR is monitored (Block S122) to check whether SINR is greater than T8 and less than T7. If the measurement condition is met and the use case is already in the BWP (Block S124), the corresponding use case is set up in the BWP, e.g., via processing circuitry 42 and/or processor 44 and/or BWP control unit 28, based on priorities. If the 64/256QAM use case is not already set up (Block S124), the example method may update priorities to a predefined level (Block S126) and/or may update priorities based on service of the WD 22 (Block S128). In a case where a maximum number of BWPs is reached (Block S130) and the current 64QAM/256QAM use case has higher priority than uses case(s) in current BWPs (Block S132), the example may replace (Block S134) the lowest priority use case with the 64/256QAM use case. The 64/256QAM may be added (Block S134) if the maximum number of BWP is not reached (Block S130). If the measurement condition is not met (Block S122), the example method includes updating priority to a lower priority (Block S136). Thresholds that trigger the setup of use-cases, e.g., via processing circuitry 42 and/or processor 44 and/or BWP control unit 28, may be determined based on simulation results or on field data analysis. In addition, or in the alternative, to 64/256QAM, other use cases may also be set up, such as high-speed use case (Block S138), slot-aggregation use case (Block S140), which would follow a similar flow in the flowchart as in the use case for 64/256QAM. In other words, the number or type of use cases is not limited to the number of use cases shown in the flowchart.

Figure 14:
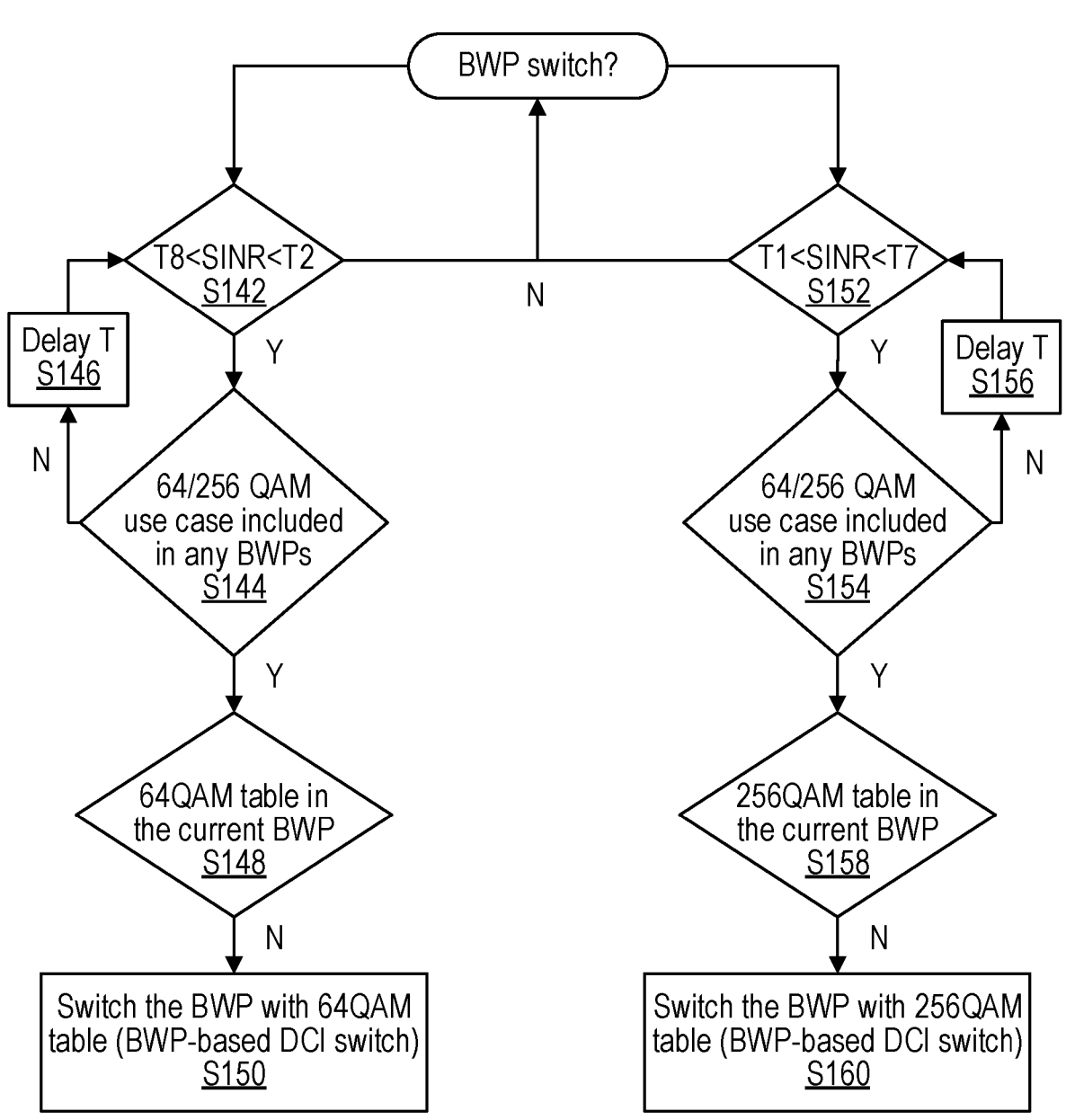
FIG. 14 is a flowchart of an example method for BWP switching according to some embodiment of the present disclosure.

FIG. 14 is a flowchart of an example method for BWP switching, e.g., via processing circuitry 42 and/or processor 44 and/or BWP control unit 28, according to some embodiments of the present disclosure. According to the example method, when SINR to the WD is within a range of [T8, T2] (Block S142), the use case may be set up in a BWP, followed by the example method shown in FIG. 13. The delay blocks (Block S146) and (Block S156) in FIG. 14 may be included to resolve a corner case to ensure a use case is set up before BWP switching occurs. If the BWP is not setup for the use case (Block S144), then example method waits for a pre-defined amount of time, T, (Block S146), before checking again whether SINR is within the [T8, T2] range (Block S142). If a 64/256AQM use case is included in any of the BWPs (Block S144) and a 64AQM table is not in already the current BWP (Block S148), the current BWP is switched (Block S150) with the 64QAM table. Similarly, if SINR is within a range of [T1, T7] (Block S152) and a 64/256QAM use case is included in any BWPs (Block S154) and a 256QAM table is not in the current BWP (Block S158), the current BWP is switched (Block S160) with the 256QAM table. If the BWP is not setup for the use case (Block S154), then example method waits for a predefined amount of time, T, (Block S156), before checking again whether SINR is within the [T1, T7] range (Block S152).

In other words, each use case may have a trigger condition. For example, 256QAM and 64QAM table switch is based on the SINR of the WD. When the SINR is lower to a threshold, there is a need to switch from a 256QAM to a 64QAM table. When the SINR is higher than a threshold, the 64QAM table and the 256QAM table are switched. The thresholds for 64QAM and 256QAM may be set to different values to avoid "ping-pong" switching, e.g., setting thresholds in such a manner that no switching occurs between two values of SINR, such as between T1 and T2.

After the network node 16 performs the BWP switch, the WD 22 receives an active BWP signal (e.g., WD 22 receives a signal by an active BWP) from the network node identifying at least a next BWP, e.g., based on the 64/256QAM table. The WD 22 retrieves, e.g., via processing circuitry 58 and/or processor 60 and/or WD BWP unit 30, an adaptively configured BWP based at least on the next BWP and switches e.g., via processing circuitry 58 and/or processor 60 and/or WD BWP unit 30 and/or communication interface 54, to the retrieved actively configured BWP for communication between the WD 22 and the network node 16.

In cases of high-speed WDs 22, the BWP switch may be triggered by speed change of the WD 22. For example, when the WD 22 has the positive speed change and the change exceeds a threshold, then there is a trigger to cause a BWP switch, e.g., via processing circuitry 42 and/or processor 44 and/or BWP control unit 28 and/or radio interface 36, to a configuration associated with high speed, and vice versa. If the WD 22 is operating at a high speed, a determination, e.g., via processing circuitry 42 and/or processor 44 and/or BWP control unit 28, whether a BWP with high speed configuration is active may be performed. If no BWP with high speed configuration is active, the network node may configure, e.g., via processing circuitry 42 and/or processor 44 and/or BWP control unit 28, a BWP with high speed configuration.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for a network node to adaptively configure bandwidth parts, BWPs, for a wireless device, WD, the method comprising:

selecting at least one use case to be assigned to at least one BWP, the selecting being based at least in part on a WD context, selecting the at least one use case being further based on a use case priority, the use case priority including at least one of: a predefined importance of the at least one use case, and a quality of service, QoS, threshold and, when a measurement condition for a use case is met, updating priorities of the at least one use case by one or more of: updating to predefined levels and replacing a lowest priority use case with the use case, and, when the measurement condition for the use case is not met, updating the priority of the use case to a lower priority; and adaptively configuring at least one BWP for the WD based on the selected at least one use case.

2. The method of claim 1, further including:

configuring the WD to communicate with the network node utilizing at least one preconfigured BWP.

3. The method of claim 1, further including:

determining the WD context, the WD context being based at least in part on at least one of:

received signals from the WD; and an estimated WD context, the estimated WD context being estimated by the network node based at least on one of a monitoring scheduling behavior to WD and the received signals from the WD.

4. The method of claim 1, wherein adaptively configuring at least one BWP for the WD further includes:

assigning the at least one use case to the at least one BWP; and transmitting the at least one BWP to the WD.

5. The method of claim 4, wherein the at least one BWP is transmitted to the WD via a predefined message type, the at least one BWP including a BWP configuration associated with the at least one use case.

6. The method of claim 1, further including:

determining an active BWP in current use for communication between the network node and the WD;

selecting a next BWP from the at least one adaptively configured BWP based on the WD context;

switching the active BWP by making the next BWP the active BWP for communication between the network node and the WD; and transmitting a signal to the WD based on the active BWP, the transmitted signal identifying at least the next BWP.

7. The method of claim 6, wherein switching the active BWP includes switching the active BWP using downlink control information, DCI.

8. The method of claim 6, wherein selecting a next BWP is further based on at least a trigger threshold predefined in the selected at least one use case.

9. A method for a wireless device, WD, supporting communication with a network node, the method comprising:

receiving a signal having at least one adaptively configured BWP based on at least one use case and a WD context, the at least one use case being selected based on a use case priority, the use case priority including at least one of: a predefined importance of the at least one use case, and a quality of service, QoS, threshold and, when a measurement condition for a use case is met, updating priorities of the at least one use case by one or more of: updating to predefined levels and replacing a lowest priority use case with the use case, and, when the measurement condition for the use case is not met, updating the priority of the use case to a lower priority; and storing the at least one adaptively configured BWP for communication with the network node.

10. The method of claim 9, further including:

receiving a configuration, the configuration including at least one preconfigured BWP; and configuring the WD based on the configuration to communicate with the network node utilizing the at least one preconfigured BWP.

11. The method of claim 9, wherein the signal having at least one adaptively configured BWP is received via a predefined message type.

12. The method of claim 11, further including:

receiving a signal by an active BWP identifying at least a next BWP;

retrieving an adaptively configured BWP based at least on the next BWP; and switching to the retrieved actively configured BWP for communication between the WD and the network node.

13. The method of claim 12, wherein switching to the retrieved actively configured BWP is based at least on downlink control information, DCI.

14. The method of claim 12, wherein identifying at least a next BWP is based at least on a trigger threshold predefined in at least one use case associated with the next BWP.

15. A network node configured to adaptively configure bandwidth parts, BWPs, for a wireless device, WD, the network node comprising:

processing circuitry, the processing circuitry having a processor and a memory, the processing circuitry configured to:

select at least one use case to be assigned to at least one BWP, the selecting being based at least in part on a WD context, selecting the at least one use case being further based on a use case priority, the use case priority including at least one of: a predefined importance of the at least one use case, and a quality of service, QoS, threshold and, when a measurement condition for a use case is met, updating priorities of the at least one use case by one or more of: updating to predefined levels and replacing a lowest priority use case with the use case, and, when the measurement condition for the use case is not met, updating the priority of the use case to a lower priority; and adaptively configure at least one BWP for the WD based on the selected at least one use case.

16. The network node of claim 15, wherein the processing circuitry is further configured to:

configure the WD to communicate with the network node utilizing at least one preconfigured BWP.

17. The network node of claim 15, wherein the processing circuitry is further configured to:

determine the WD context, the WD context being based at least in part on at least one of:

received signals from the WD; and an estimated WD context, the estimated WD context being estimated by the network node based at least on one of a monitoring scheduling behavior to WD and the received signals from the WD.

18. The network node of claim 15, wherein adaptively configuring at least one BWP for the WD further includes:

assigning the at least one use case to the at least one BWP; and causing transmission of the at least one BWP to the WD.

19. The network node of claim 18, wherein the at least one BWP is caused to be transmitted to the WD via a predefined message type, the at least one BWP including a BWP configuration associated with the at least one use case.

20. The network node of claim 15, wherein the processing circuitry is further configured to:

determine an active BWP in current use for communication between the network node and the WD;

select a next BWP from the at least one adaptively configured BWP based on the WD context;

switch the active BWP by making the next BWP the active BWP for communication between the network node and the WD; and cause transmission of a signal to the WD based on the active BWP, the transmission of the signal identifying at least the next BWP.

21. The network node of claim 20, wherein switching the active BWP includes switching the active BWP using downlink control information, DCI.

22. The network node of claim 20, wherein selecting a next BWP is further based on at least a trigger threshold predefined in the selected at least one use case.

23. A wireless device, WD, configured to communicate with a network node, the WD comprising:

a radio interface configured to:

receive a signal having at least one adaptively configured BWP based on at least one use case and a WD context, the at least one use case being selected based on a use case priority, the use case priority including at least one of: a predefined importance of the at least one use case, and a quality of service, QoS, threshold and, when a measurement condition for a use case is met, updating priorities of the at least one use case by one or more of: updating to predefined levels and replacing a lowest priority use case with the use case, and, when the measurement condition for the use case is not met, updating the priority of the use case to a lower priority; and processing circuitry in communication with the radio interface, the processing circuitry having a processor and a memory, the processing circuitry configured to: store the at least one adaptively configured BWP for communication with the network node.

24. The WD of claim 23, wherein the radio interface is further configured to:

receive a configuration, the configuration including at least one preconfigured BWP; and the processing circuitry is further configured to:

configure the WD based on the configuration to communicate with the network node utilizing the at least one preconfigured BWP.

25. The WD of claim 23, wherein the signal having at least one adaptively configured BWP is received via a predefined message type.

26. The WD of claim 25, wherein the radio interface is further configured to:

receive a signal by an active BWP identifying at least a next BWP; and the processing circuitry is further configured to:

retrieve an adaptively configured BWP based at least on the next BWP; and switch to the retrieved actively configured BWP for communication between the WD and the network node.

27. The WD of claim 26, wherein switching to the retrieved actively configured BWP is based at least on downlink control information, DCI.

28. The WD of claim 26, wherein identifying at least a next BWP is based at least on a trigger threshold predefined in at least one use case associated with the next BWP.

* * * * *